(12) United States Patent
Holland et al.

(10) Patent No.: US 8,919,476 B2
(45) Date of Patent: Dec. 30, 2014

(54) PLATFORM DOLLY SYSTEM

(75) Inventors: Christopher M. Holland, Forest City, IA (US); Constantine Marmaras, Forest City, IA (US); Paul B. Oulman, Forest City, IA (US)

(73) Assignee: Holland Moving & Rigging Supplies, Inc., Forest City, IA (US)

( * ) Notice: Subject to any disclaimer, the term of this patent is extended or adjusted under 35 U.S.C. 154(b) by 118 days.

(21) Appl. No.: 13/545,138

(22) Filed: Jul. 10, 2012

(65) Prior Publication Data

US 2013/0015631 A1    Jan. 17, 2013

Related U.S. Application Data

(60) Provisional application No. 61/506,288, filed on Jul. 11, 2011.

(51) Int. Cl.
*B62D 1/00* (2006.01)
*B62D 12/02* (2006.01)
*B60P 3/40* (2006.01)

(52) U.S. Cl.
CPC ........ *B62D 12/02* (2013.01); *B62D 1/00* (2013.01); *B60P 3/40* (2013.01)
USPC .......................................... 180/167

(58) Field of Classification Search
CPC ........... B62B 1/264; B62B 3/104; B66F 9/06; B66F 9/20; B60P 3/40; B60P 3/41; B60P 1/6463
USPC .............. 180/167, 168; 280/79.11, 79.6; 187/224, 233, 242, 243, 244; 414/234, 414/389, 373, 572, 809
See application file for complete search history.

(56) References Cited

U.S. PATENT DOCUMENTS

| | | | | |
|---|---|---|---|---|
| 3,112,037 A | * | 11/1963 | Thiermann | 414/23 |
| 3,187,830 A | * | 6/1965 | Hilton | 180/20 |
| 3,398,806 A | * | 8/1968 | Hendricks | 180/9.1 |
| 3,568,785 A | * | 3/1971 | Gray | 180/20 |
| 3,612,312 A | * | 10/1971 | Behrmann | 414/812 |
| 3,689,106 A | * | 9/1972 | Young | 410/1 |
| 4,053,182 A | | 10/1977 | Nelson | |
| 4,222,581 A | * | 9/1980 | Treadwell et al. | 280/81.1 |
| 4,408,739 A | * | 10/1983 | Buchsel | 244/137.1 |
| 4,527,651 A | * | 7/1985 | Thiermann, Sr. | 180/19.2 |
| 4,572,531 A | * | 2/1986 | Elia | 280/62 |
| 4,666,365 A | * | 5/1987 | Cradeur | 414/745.3 |
| 4,762,192 A | * | 8/1988 | Maxwell | 180/14.2 |

(Continued)

FOREIGN PATENT DOCUMENTS

DE    202012102062 U1 * 11/2013
GB    1 572 520          7/1980

(Continued)

*Primary Examiner* — J. Allen Shriver, II
*Assistant Examiner* — Jacob Meyer
(74) *Attorney, Agent, or Firm* — Zarley Law Firm, P.L.C.

(57) ABSTRACT

A platform dolly system that has first and second dolly devices. Each of the dolly devices has a power unit, a frame, a suspension and a wheel rotatably secured to an axle. A control unit remote to the first and second dolly devices is presented that is in over the air electronic communication with the power unit of each of the first and second dolly devices in order to either simultaneously or independently control the first and second dolly devices depending upon the mode of the control unit.

13 Claims, 5 Drawing Sheets

(56) References Cited

U.S. PATENT DOCUMENTS

| | | | |
|---|---|---|---|
| 4,915,567 A * | 4/1990 | Ellingsen | 414/345 |
| 5,056,981 A * | 10/1991 | Knowles | 414/495 |
| 5,219,175 A * | 6/1993 | Woelfel | 280/47.131 |
| 5,335,923 A * | 8/1994 | Langenback et al. | 280/79.11 |
| 5,372,353 A * | 12/1994 | West | 254/10 B |
| 5,449,184 A * | 9/1995 | Knobloch | 280/79.11 |
| 5,492,353 A * | 2/1996 | Chapman | 280/47.11 |
| 5,701,966 A * | 12/1997 | Amico | 180/7.2 |
| 5,813,228 A * | 9/1998 | Kubota et al. | 60/454 |
| 6,275,167 B1 | 8/2001 | Dombrowski et al. | |
| 6,612,152 B2 * | 9/2003 | Keaton et al. | 73/11.04 |
| 6,647,328 B2 | 11/2003 | Walker | |
| 6,668,950 B2 * | 12/2003 | Park | 180/7.1 |
| 6,772,997 B2 * | 8/2004 | Keaton et al. | 254/90 |
| 6,814,643 B1 | 11/2004 | Dooley et al. | |
| 7,120,519 B2 | 10/2006 | Okabayashi et al. | |
| 7,134,829 B2 * | 11/2006 | Quenzi et al. | 414/482 |
| 7,156,403 B2 * | 1/2007 | Abbott | 280/79.11 |
| 7,461,711 B2 * | 12/2008 | McCrary et al. | 180/9.1 |
| 7,494,137 B2 * | 2/2009 | Doak | 280/62 |
| 7,673,889 B2 * | 3/2010 | Wells et al. | 280/79.11 |
| 7,758,399 B2 | 7/2010 | Weiss et al. | |
| 7,853,372 B2 | 12/2010 | Park et al. | |
| 7,946,606 B2 * | 5/2011 | Roush | 280/476.1 |
| 7,992,278 B2 * | 8/2011 | McCrary et al. | 29/430 |
| 8,118,532 B2 * | 2/2012 | Phillips | 414/467 |
| 8,534,694 B2 * | 9/2013 | Banwart | 280/476.1 |
| 2002/0062686 A1 * | 5/2002 | Keaton et al. | 73/116 |
| 2003/0218374 A1 * | 11/2003 | Kress | 298/22 P |
| 2003/0221878 A1 * | 12/2003 | Park | 180/7.1 |
| 2004/0061100 A1 * | 4/2004 | Keaton et al. | 254/90 |
| 2006/0108470 A1 * | 5/2006 | McCrary et al. | 244/50 |
| 2007/0040353 A1 * | 2/2007 | Dallaire et al. | 280/476.1 |
| 2007/0048115 A1 * | 3/2007 | Fenelli et al. | 414/512 |
| 2007/0085288 A1 * | 4/2007 | Wells et al. | 280/79.11 |
| 2007/0264110 A1 * | 11/2007 | Rhodes et al. | 414/458 |
| 2008/0238010 A1 * | 10/2008 | Hadar | 280/43.12 |
| 2009/0033060 A1 * | 2/2009 | Roush | 280/432 |
| 2009/0067952 A1 * | 3/2009 | Rhodes et al. | 414/12 |
| 2009/0230368 A1 * | 9/2009 | Marsh et al. | 254/35 |
| 2009/0267320 A1 * | 10/2009 | Phillips | 280/415.1 |
| 2010/0028123 A1 * | 2/2010 | McCrary et al. | 414/806 |
| 2010/0054907 A1 * | 3/2010 | Puls | 414/809 |
| 2010/0126790 A1 * | 5/2010 | Terry | 180/264 |
| 2011/0074132 A1 * | 3/2011 | Banwart | 280/476.1 |
| 2012/0067653 A1 * | 3/2012 | Mallett et al. | 180/6.5 |
| 2014/0015223 A1 * | 1/2014 | Banwart | 280/476.1 |

FOREIGN PATENT DOCUMENTS

| | | |
|---|---|---|
| GB | 2463461 | 3/2010 |
| WO | 87/06323 | 10/1987 |
| WO | 2006/078873 | 7/2006 |
| WO | 2008/091775 | 7/2008 |
| WO | 2009/040098 | 4/2009 |
| WO | 2010/033096 | 3/2010 |

* cited by examiner

PLATFORM DOLLY SYSTEM

CROSS REFERENCE TO RELATED APPLICATION

This application claims the benefit of U.S. Provisional Application No. 61/506,288 filed Jul. 11, 2011.

BACKGROUND OF THE INVENTION

This invention relates to a platform dolly system. More specifically, this invention relates to a dolly system utilized to transport heavy equipment and product.

When moving heavy equipment or product such as industrial sized pipe that can be up to 300 feet long and 40 inches wide and up to 100 tons for a load, typically the platform utilized is trailer oriented. Platform trailers are used for moving large pipes for the oil industry, large tanks in the heavy transport business as well as large support segments for the wind industry. Typically these structural pieces are placed on a platform trailer that is difficult to maneuver and extremely expensive to manufacture because the trailer is a vehicle that is directly operated by an individual. As such, many deficiencies in the art are presented.

Therefore a principal object of the present invention is to provide a platform dolly system that is easy to maneuver.

Yet another object of the present invention is to provide a platform dolly system that facilitates the moving of large industrial equipment and industrial sized pipes.

These and other objects, features, and advantages will become apparent from the specification and claims.

BRIEF SUMMARY OF THE INVENTION

A platform dolly system that has a first dolly device with a power unit, a frame, a suspension and a wheel secured to an axle. The system additionally has a similar second dolly device that also has its own frame, suspension, power unit and wheel rotatably secured to an axle. The platform dolly system additionally has a control unit that is remote from the first and second dolly devices and in electronic communication with the power unit of the first dolly and the power unit of the second dolly to independently operate the first dolly devices to move a load.

DETAILED DESCRIPTION OF THE PREFERRED EMBODIMENT

Figure 1:
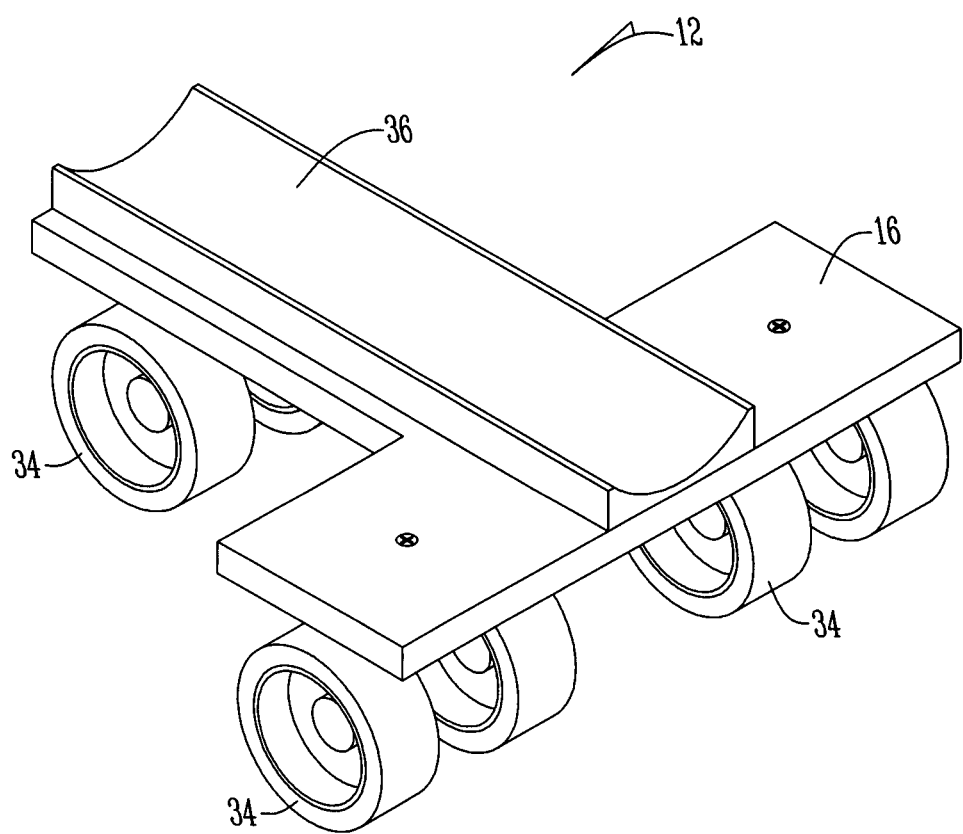
FIG. 1 is a perspective view of a dolly of a platform dolly system.
Figure 2:
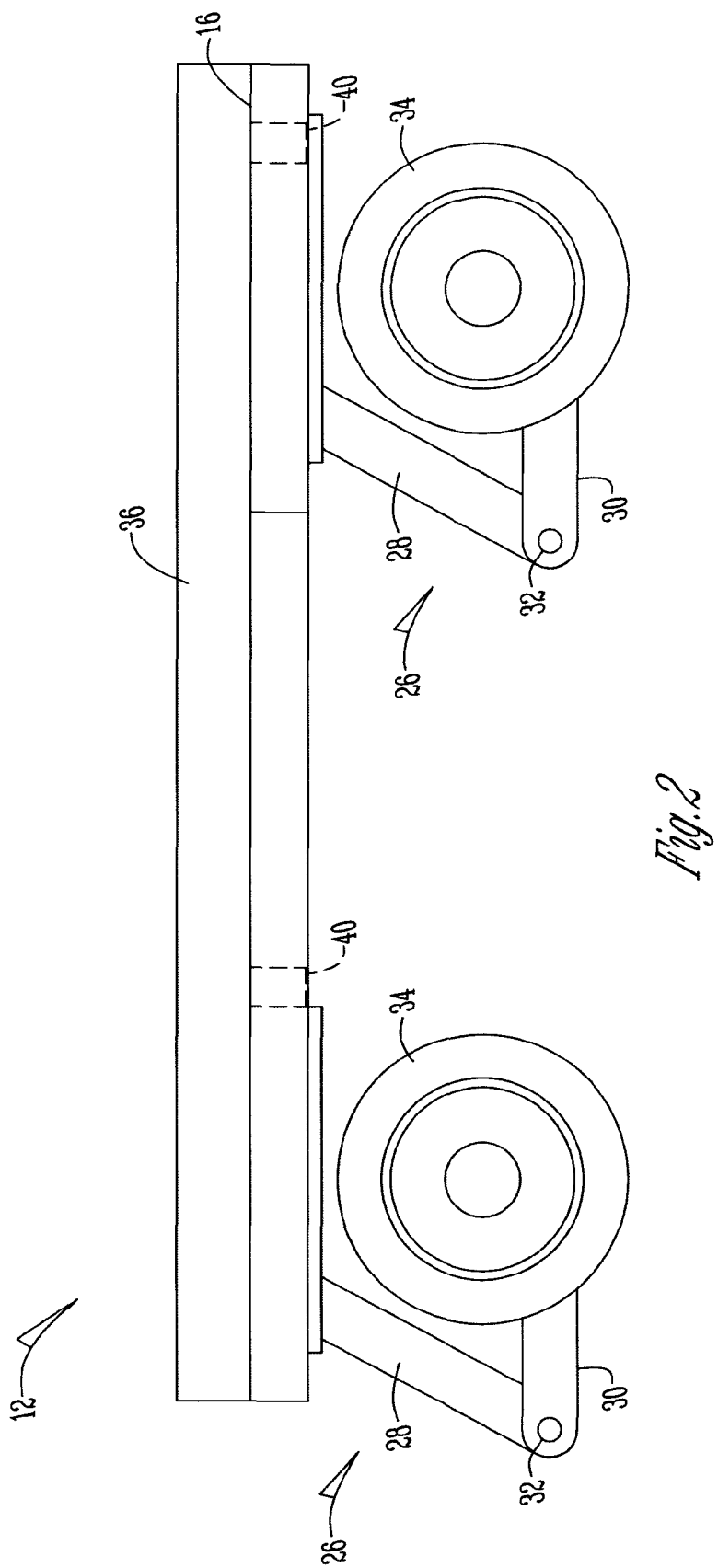
FIG. 2 is a side plan view of a dolly of a platform dolly system.
Figure 3:
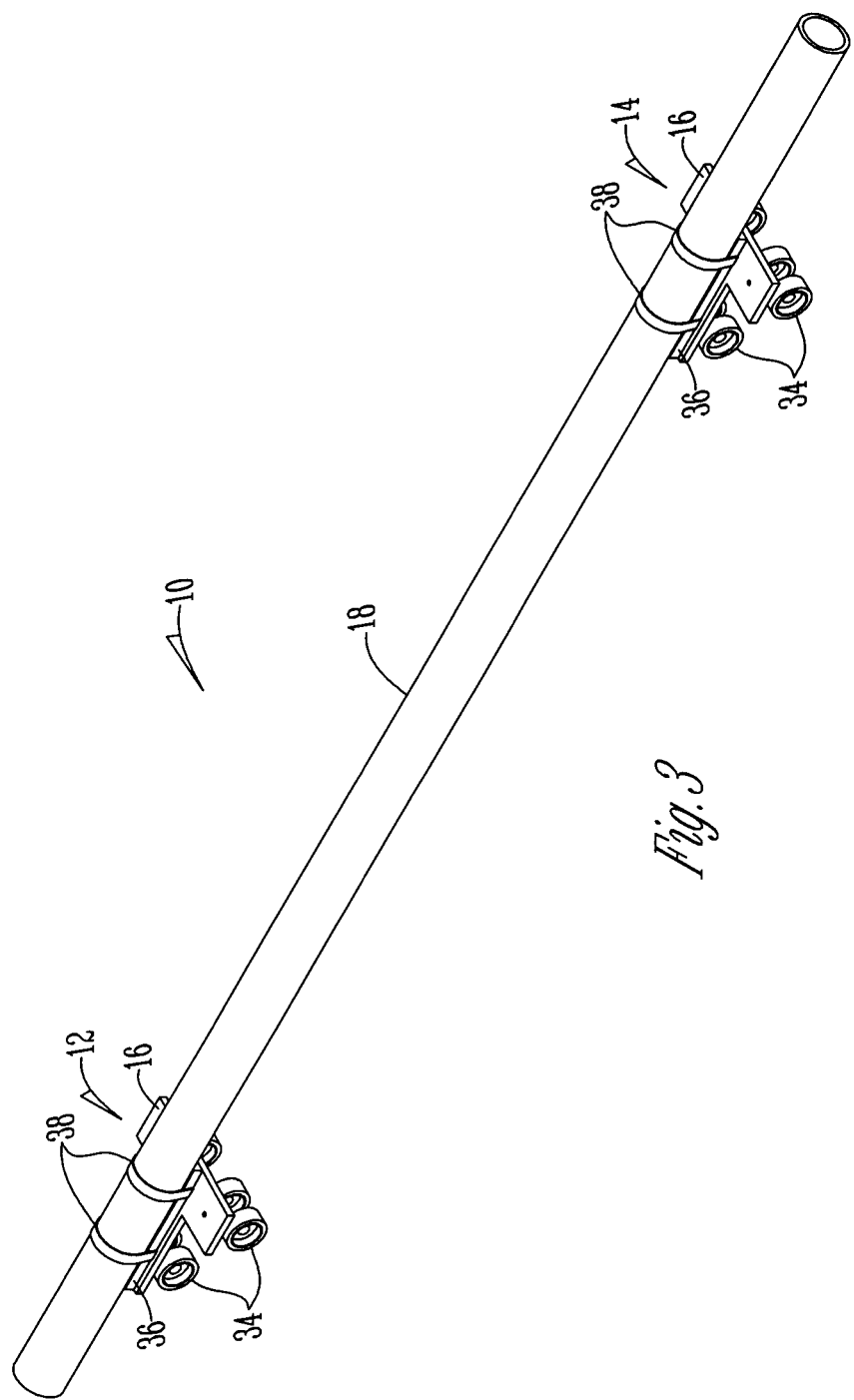
FIG. 3 is a plan view of a first and second dolly of a platform dolly system.

The figures show a platform dolly system 10 that utilizes first and second dolly devices 12 and 14 that are separate from one another. Each of the first and second dolly devices, systems or modules 12 or 14 has a frame 16 that in a preferred embodiment is generally T-shaped in order to support the weight of a load 18 such as heavy equipment, industrial pipe, or the like.

A power unit 20 is attached to the frame 16 having first and second hydraulic pumps 22 and 24 that are fluidly connected to one another to operate the dollies 12 and 14. Pivotally connected to the frame 16 and fluidly connected to the hydraulic pumps 22 and 24 is a knuckle suspension 26 that has first and second legs 28 and 30 that are pivotally connected at a pivot point 32 in order to raise and lower the frame 16 of the dolly 12 or 14. Wheels 34 are connected to the second leg 30 of the knuckle suspension 26 such that the wheels 34 in connection with the knuckle suspension 26 when operated by the power unit 20 move transverse, forward and in reverse. Specifically, the power unit 20 utilizes the first and second hydraulic pumps 22 and 24 in order to propel, raise, lower, and steer the wheels 34 via the knuckle suspension 26. The power unit 20 also controls a braking mechanism (not shown).

Removably attached to the frame 16 is an interchangeable saddle 36 that in one embodiment is lined with rubber and has nylon tie down straps 38 and is arcuate in shape in order to accommodate an industrial pipe or other load 18. The saddle 36 is removable and can be replaced for other specific applications other than the use of moving the industrial pipe or arcuately shaped bodies. Disposed under and secured to the frame 16 are a plurality of cylinders 40 that are fluidly connected to the power unit 20 such that the cylinders 40 raise and lower the saddle 36. In one embodiment when only a single dolly system 12 or 14 is utilized four spaced apart cylinders 40 are used where two of the four are fluidly connected to one another. In this manner three points or zones of lift are provided to ensure a three point lift is accomplished when lifting a load 18.

Alternatively, when first and second dolly systems 12 or 14 are utilized four cylinders 40 can be placed under the saddle 36 of the first dolly system 12 and four cylinders 40 under the saddle 36 of the second dolly system 14. Then the four cylinders 40 of the first dolly system 12 can be fluidly connected while two sets of two cylinders 40 can be fluidly connected under the saddle 36 of the second dolly system 14. In this manner again three points or zones are provided such that the object 18 on the saddles 36 remains stable on a level plane during the raising and lowering of the object 18.

Figure 4:
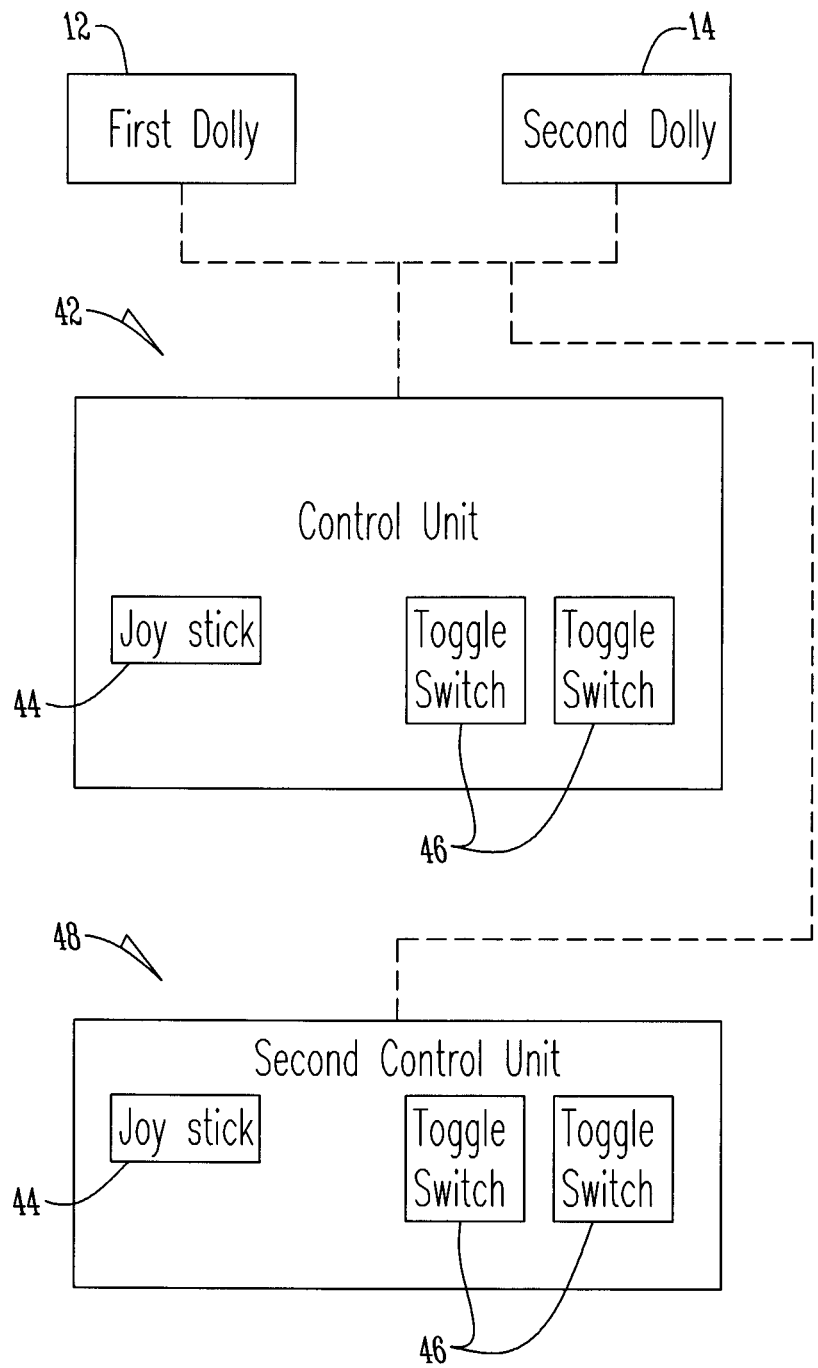
FIG. 4 is a schematic diagram of a platform dolly system.
Figure 5:
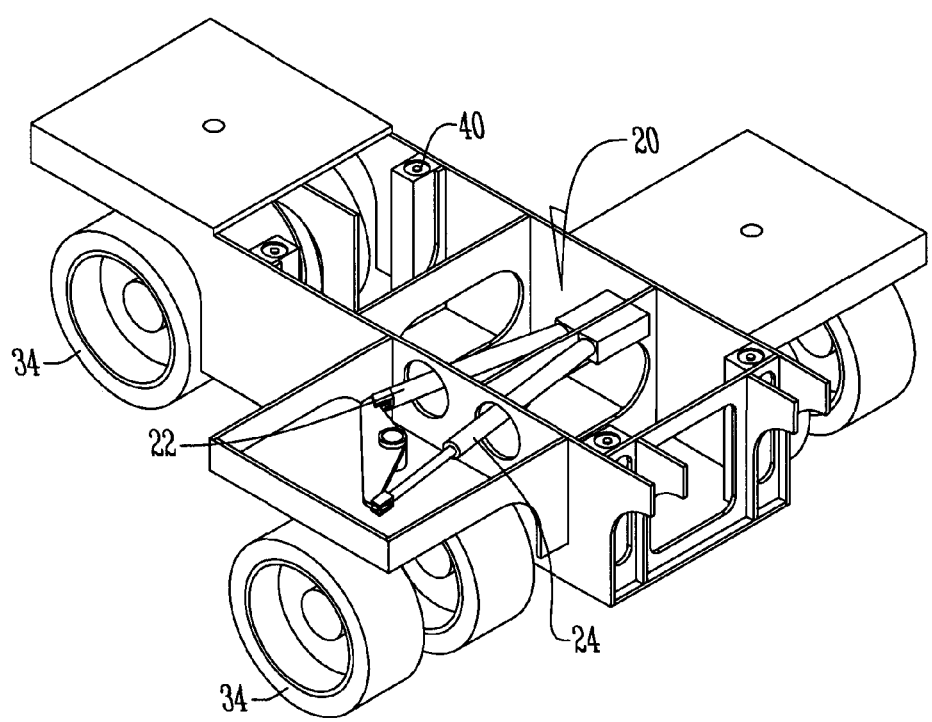
FIG. 5 is a top perspective view with hidden lines showing the interior of a dolly of a platform dolly system.

FIG. 4 shows a control unit 42 that is in over the air communication with the power unit 20 in order to remotely and wirelessly control each of the first and second dollies 12 and 14 independently. Specifically, the control unit 42 utilizes electronic components 44 and sends over the air signals to each of the first and second dollies 12 and 14 in order to actuate the first and second hydraulic pumps 22 and 24 to propel the dollies 12 and 14, raise and lower the knuckle suspension 26, and/or steer the wheels 36 of each of the first and second dollies 12 and 14. The control unit 42 can have a joystick style control 44 and toggle switches 46 for discrete operations such as air brakes, engine RPM, high/low speed, and the like. A master/slave relationship is used to allow for both independent and simultaneous control of the systems 12 and 14.

In a first mode the control unit 42 operates each of the dollies 12 and 14 simultaneously and thus each operates identically as an operator desires. In a second mode, the first and second dollies 12 and 14 operate independently wherein the operator can manipulate the first dolly 12 to provide movements while the second dolly 14 acts as a set of wheels 34 without the propelling, steering or lifting functions being actuated. Once the first dolly 12 is properly moved the second dolly 14 can then similarly be manipulated without actuation of the first dolly 12.

In operation, when an industrial piece of equipment, such as an industrial pipe, needs to be moved, an individual places the interchangeable saddle 36 onto the frame 16 of each of the first and second dollies 12 and 14 of the platform dolly system 10 in order to specifically accommodate the pipe. While described as using the system 10 to move industrial pipe, any heavy piece of equipment, machinery, structure or the like could be moved without falling outside the scope of this disclosure.

The first and second dollies 12 and 14 are then either moved simultaneously or individually into a loading position by aligning the pipe with the interchangeable saddle 36 by maneuvering each of the first and second dollies 12 and 14 and by raising and lowering the knuckle suspension 26. Once the industrial pipe is placed onto the first and second dollies 12 and 14 an individual remotely operates the first and second dollies 12 and 14 either individually or simultaneously in order to move the industrial pipe to a desired location. Specifically, by having the two individual dollies 12 and 14 with each able to independently steer and move in forward and reverse directions, turns and maneuvering that cannot be accomplished by a platform trailer can be accomplished.

Thus, provided is a platform dolly system 10 that utilizes first and second dollies 12 and 14 that can be individually operated to provide enhanced maneuverability of heavy industrial product during the moving process. The platform dolly system 10 is inexpensive to manufacture and can be operated remotely providing additional improvements over the typical platform trailer systems.

In addition, as a result of the T-shape of the frame 16, a stable three point base is provided minimizing the number of axles and cost of the system 10. The knuckle suspension 26 is designed to minimize the overall height and to allow enough lift in order for the system to self-load and unload. The steering of the separate individual dollies 12 and 14 allows for wide angle turns of at least 135 degrees to address transverse movement between stations and storage area. The increase of the angle past 90 degrees thus allows for adjustment during traveling.

For each dolly unit 12, 14, the power unit 20 is integrated into the frame 16 to allow the lowest possible height of the frame 16. The saddle 36 is lined with heavy rubber conveyor belting to protect the surface of the industrial pipe and nylon ratchet straps 38 can be used in order to tie down the load 18. The saddle 36 is removable to allow the platforms to be used for other material handling tasks.

The control unit 42 is the main interface between the operator and the transport system 10. A secondary wired pendant can be provided as a backup. When traveling empty the dollies 12 and 14 can be controlled independently allowing each operator to locate their system under the load 18 individually. Once the load 18 has been picked up and secured, the control unit 42 or master remote can be switched to simultaneous mode. This allows one master remote 42 to coordinate travel speed for both transport systems 12 and 14. Steering may still need to be controlled independently and in some cases to make corrections to the load while traveling axially. In an alternative arrangement, a second control unit 48 is provided which is like the first control unit 42. Second control unit 48 allows a second operator to operate second dolly 14 independently of first dolly 12 which is independently controlled by a first operator through first control unit 42. Thus, in all the system 10 improves maneuverability and reduces costs, and at the very least all of the stated objects have been met.

What is claimed is:

1. A platform dolly system comprising:

a first dolly device having a power unit, a frame, at least one knuckle suspension pivotally connected to the frame and fluidly connected to a first hydraulic pump and a second hydraulic pump of the power unit, and at least one wheel secured to the knuckle suspension;

the knuckle suspension having a first leg and a second leg, the first leg is connected to the frame at one end and at the opposite end to one end of the second leg at a pivot point to raise and lower the frame of the first dolly device, wherein the opposite end of the second leg is connected to the wheel;

a second dolly device having a power unit, a frame, a suspension secured to the frame of the second dolly, and a wheel rotatably secured to the suspension of the second dolly; and a control unit remote from the first and second dolly devices and in electronic communication with the power unit of the first dolly and the power unit of the second dolly to independently operate the first and second dolly devices to move a load;

wherein, when the first dolly is operated by the power unit, the first and second hydraulic pumps are operable to steer the at least one wheel via rotation of the at least one knuckle suspension to move transverse, forward, and reverse.

2. The system of claim 1 wherein the frame of the first dolly is T-shaped.

3. The system of claim 1 wherein the suspension of the second dolly is a knuckle suspension that has first and second legs that are pivotally connected at a pivot point to raise and lower the frame of the second dolly device.

4. The system of claim 1 wherein the first dolly device has a removable saddle secured to the frame of the first dolly that is arcuate in shape to receive an industrial pipe.

5. The system of claim 4 wherein a cylinder fluidly connected to the power unit of the first dolly is secured under the saddle to provide lift to that saddle.

6. The system of claim 1 wherein the first dolly has four spaced apart cylinders connected to the power unit of the first dolly and secured to the frame of the first dolly to provide three zones of lift when lifting a load.

7. The system of claim 1 wherein the control unit has a joystick.

8. The system of claim 1 wherein the control unit allows for both independent control of the first and second dolly devices and simultaneous control of the first and second dolly devices.

9. The system of claim 1 wherein the control unit in a first mode operates the first and second dolly devices simultaneously.

10. The system of claim 1 wherein the control unit in a second mode provides a movement to the first dolly device while the second dolly device does not propel.

11. The system of claim 4 wherein the saddle is lined with rubber and has nylon tie down straps.

12. The system of claim 1 wherein the first dolly has three suspensions arranged in a T-shape.

13. A platform dolly system comprising:

a first dolly device having a power unit, a frame, at least one knuckle suspension pivotally connected to the frame and fluidly connected to a first hydraulic pump and a second hydraulic pump of the power unit, and at least one wheel secured to the knuckle suspension;

the knuckle suspension having a first leg and a second leg connected at a pivot point to raise and lower the frame of the first dolly device, wherein the second leg is connected to the wheel at one end;

a second dolly device having a power unit, a frame, a knuckle suspension pivotally connected to the frame of the second dolly and fluidly connected to a first hydraulic pump and a second hydraulic pump of the power unit of the second dolly, and at least one wheel secured to the suspension of the second dolly; and a control unit remote from the first and second dolly devices and in electronic communication with the power unit of the first dolly and the power unit of the second dolly to independently operate the first and second dolly devices to move a load;

wherein, when the first dolly and second dolly are operated by the respective power units, the respective first and second hydraulic pumps are operable to steer the respective at least one wheel via rotation of the respective at least one knuckle suspension to move the first dolly and second dolly forward, reverse, and transverse.

\* \* \* \* \*